United States Patent [19]

Nattel et al.

[11] Patent Number: 5,354,953
[45] Date of Patent: Oct. 11, 1994

[54] CABLE HOLDING DEVICE

[75] Inventors: William Nattel, Montreal; Mark Fabian, St-Luc, both of Canada

[73] Assignee: Eaton Corporation, Cleveland, Ohio

[21] Appl. No.: 858,460

[22] Filed: Mar. 27, 1992

[30] Foreign Application Priority Data

Aug. 7, 1991 [CA] Canada ............................ 2,048,524

[51] Int. Cl.⁵ .................... H01H 9/02; H02B 1/46; H02G 3/16
[52] U.S. Cl. ........................................ 174/54; 174/58; 174/64; 220/3.3; 220/3.9; 439/535; 439/536; 439/538
[58] Field of Search .................. 174/48, 49, 53, 54, 174/58, 60, 64; 220/3.2, 3.3, 3.9, 3.94, 4.02, 4.03; 439/449, 470, 535–539; 248/27.1

[56] References Cited

U.S. PATENT DOCUMENTS

| | | | |
|---|---|---|---|
| 1,963,951 | 6/1934 | Bowers | 220/3.92 |
| 2,875,915 | 3/1959 | Buckels | 220/3.92 X |
| 3,536,281 | 10/1970 | Meehan et al. | 220/3.9 X |
| 3,720,395 | 3/1973 | Schuplin | 220/3.9 X |
| 4,295,003 | 10/1981 | Borja et al. | 174/53 |
| 4,317,954 | 3/1982 | Giammarra | 220/3.2 X |
| 4,343,527 | 8/1982 | Harrington et al. | 439/536 X |
| 4,645,089 | 2/1987 | Horsley | 220/3.9 X |
| 5,025,944 | 6/1991 | Rodick | 220/3.9 |

FOREIGN PATENT DOCUMENTS 1071746 2/1980 Canada .

Primary Examiner—Peter Dungba Vo
Attorney, Agent, or Firm—M. J. Moran

[57] ABSTRACT

A cable holding device for holding a communication cable beside an electrical power outlet box. The cable holding device comprises a frame having a main portion and an integral base portion, extending at a right angle to the main portion of the frame, for attachment to the side wall of a power outlet box with a front face of the main portion of the frame preferably substantially co-planar with a front face of the outlet box defined by the front edges of the walls of the outlet box. The frame has at least one tab to which a communication cable may be secured. A variety of tabs are disclosed, some of which have a hole connected with an access slot for receiving the cable. The tab may be manually bent to enlarge the slot to allow passage of the cable to the opening after which the slot may be at least partially closed to retain the cable in the opening. Alternatively, the tab may be elongated with a length sufficient to secure the cable to it by tying a knot in the cable or may have a V-shaped notch for receiving and retaining the cable.

24 Claims, 5 Drawing Sheets

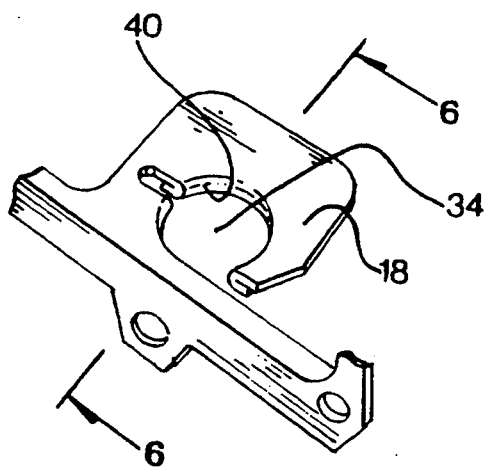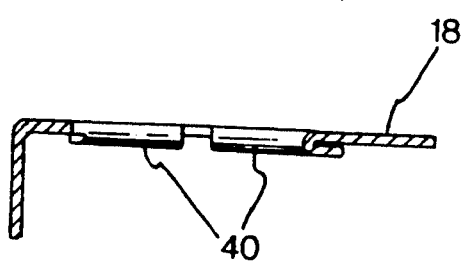
Fig.5　　　　Fig.6
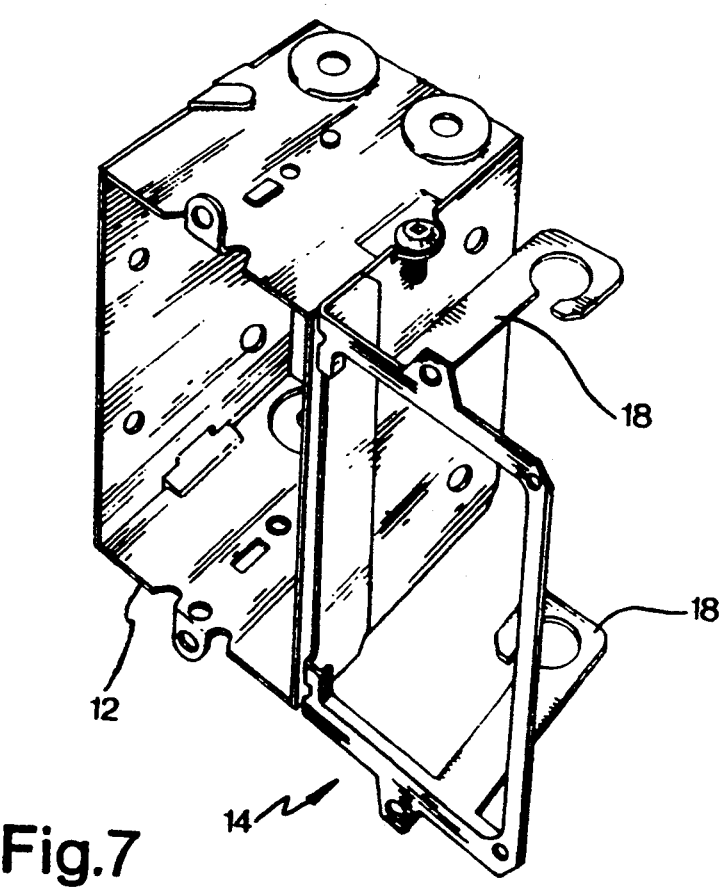
Fig.7

5,354,953

1

CABLE HOLDING DEVICE

BACKGROUND OF THE INVENTION

This invention relates to a cable holding device for holding a communication cable beside an electrical power outlet box and to the combination of an electrical power outlet box and a cable holding device for holding a communication cable beside the outlet box.

The number of communication outlets, such as telephones and cable connections, which have to be located close to an electrical receptacle, has greatly increased during the last few years. This has been caused by the increased use of communication and entertainment equipment such as telephone recording machines, facsimile transfer equipment (faxes), PC computers, cable connected television, VCR's, etc.

The Electrical Code does not allow mixing of power and communication cables in the same conduit or enclosure without a physical barrier between them.

At present, a power receptacle is attached to an electrical power outlet box and a wall plate is mounted on this power receptacle. A communication receptacle, at a separate location, is attached to a wall plate which is mounted directly to another outlet box.

Usually boxes are mounted on wall studs with the two boxes, one containing the communication connector and the other the power receptacle being 16" or 24" apart, the distance between studs. This contributes to the maze of cables often present in the back of communication equipment.

Recently a box including a bracket for mounting the communication connector has been developed. In normal construction practice, the wall studs are erected first, forming a skeleton to which later wallboards are attached. While the skeleton is still open on both sides, the electrician is mounting the outlet boxes and placing the power and communication cables in the spaces between the studs. He brings the ends of the power cable inside the electrical box. This cable stays loose inside the box until the wallboard is in place. The electrician returns then to the job site to connect the loose cable wires to the receptacle and mounts the receptacle together with the receptacle plate on top of the box.

The communication cable, however, is normally left hanging loose, behind the communication connector mounting bracket, until the wallboard is mounted and the electrician returns to connect the communication cable wires with the communication connector. This presents some difficulty because, when the electrician wants to connect the communication cable, he has first to find it. The access hole is only as large as the opening in the communication bracket, approximately 2"×3". The electrician has at times to use a wire hook to find and pull out the communication cable in order to attach it to the connector.

SUMMARY OF THE INVENTION

An object of the invention is to solve the abovementioned problem.

According to a broad aspect of the invention there is provided a cable holding device for holding a communication cable beside an electrical power outlet box. The device comprises a frame having a main portion and a base portion. The base portion extends at substantially a right angle to the main portion whereby the device may be mounted to a side of the outlet box. The frame has at least one tab to which the communication cable may be secured.

According to another broad aspect of the invention there is provided, in combination, an electrical power outlet box and a cable holding device for holding a communication cable beside the outlet box. The outlet box has a top, a bottom, first and second sides and a back defining a rectangular front opening. The device comprises a frame having a main portion and a base portion. The base portion extends at substantially a right angle to the main portion and is secured to one of the sides of the outlet box. The frame has at least one tab to which a communication cable may be secured.

The tab may be any of a number of different configurations, several of which are disclosed in detail hereinafter.

For example, the tab may comprise a flat piece of material having an outer edge, an opening for receiving the cable, and a first slot extending from the edge to the opening. The tab is manually bendable whereby the slot may be enlarged to allow passage of a cable to the opening, after which the slot may be at least partially closed to retain the cable in the opening. The tab may lave a second slot extending from the opening a distance short of the outer edge to form a zone of weakness between the second slot and the outer edge of the tab whereby the tab is easily manually bendable. Preferably the tab and frame are an integral unit formed of metal such as steel or galvanized steel. The metal may be folded back around the opening to provide a smooth surface so as not to damage the cable.

In an alternative embodiment, the tab is elongated and has a length sufficient to secure a cable to it by means of a knot in the cable.

In another alternative embodiment the tab has a V-shaped notch for receiving and retaining the cable.

Other configurations for the tab may occur to those skilled in the art.

The frame is preferably rectangular and has threaded holes to receive screws for securing a wall plate, the wall plate preferably having an opening for receiving a communication connector and openings allowing access to an electrical power outlet receptacle mounted in the power outlet box. The communication connector is secured to the mounting plate and is connected to the communication cable, after which the wall plate is secured to the electrical power outlet box and the frame of the cable holding device. It will be appreciated that the wall plate can be secured before the communication connector is mounted and connected, it being a simple matter to remove the wall plate at any time to mount and connect the communication connector.

BRIEF DESCRIPTION OF THE DRAWINGS

FIGS. 5 and 6 are detail views of one preferred form of tab, FIG. 6 being a cross-sectional view along the line 6—6 of FIG. 5, FIG. 7 is a perspective view of a cable holding device attached to an outlet box, having elongated tabs to hold a cable well away from the front of the device.

DESCRIPTION OF THE PREFERRED EMBODIMENTS

Figure 1:
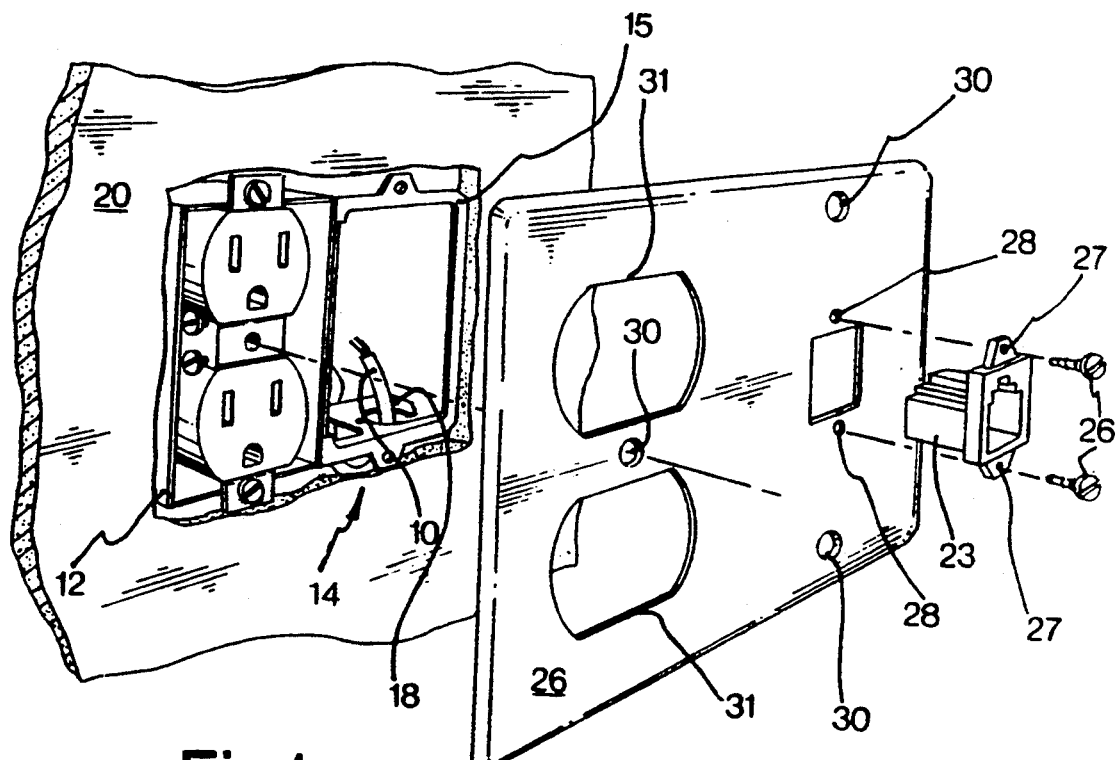
FIG. 1 is a perspective view of a cable holding device according to the invention showing it mounted in a wall structure.
Figure 2:
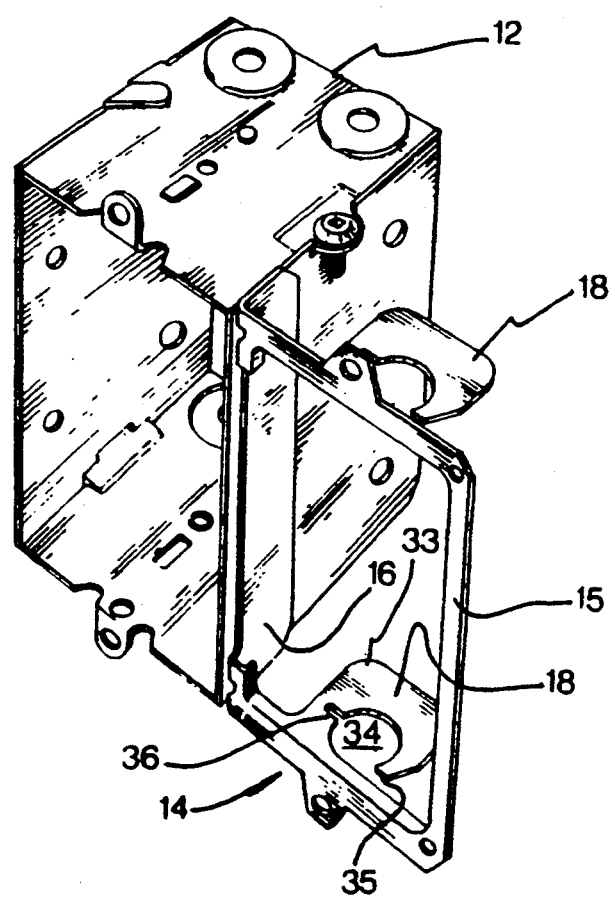
FIG. 2 is a perspective view of a holding device according to the invention attached to a standard electrical outlet box.

Referring to FIGS. 1 and 2, a cable holding device for holding a communication cable 10 beside an electrical power outlet box 12 is generally indicated at 14. The device 14 comprises a frame having a main portion 15 and a base portion 16. The base portion 16 extends at substantially a right angle to the main portion 15 whereby the device may be mounted to a side of the outlet box 12, e.g. by welding. The frame has at least one tab 18 to which the cable 10 may be secured, as will be further explained hereinafter. Preferably, however, there are two tabs 18 so that, whichever side of the outlet box 12 the device 14 is mounted to, there is a tab at the top and at the bottom of the frame.

FIG. 1 shows a communication cable 10 secured to a tab 18 of a device 14 mounted to a side of an electrical power outlet box 12, the box 12 being secured to a stud (not shown) in a hollow wall structure having a wallboard covering 20. A dual power outlet 22 is already mounted in box 12 and it is assumed that cable connector 23 is to be connected to cable 10. To do this, the cable connector 23 is inserted into a mounting hole 25 in wall plate 26 and attached thereto by any suitable means such as screws 42 through holes 27 in cable connector 23 and holes 28 in wall plate 26. The cable 10 is then connected to cable outlet 27 and the wall plate is attached to the dual power outlet 22 and the main portion 15 of the frame of the holding device 14 by means of screws (not shown) through holes 30 in wall plate 26 and holes 32 in frame portion 15. Openings 31 in wall plate 26 accommodate the dual power outlet 22.

Obviously, the cable connector 23 could be connected to cable 10 before being secured to wall plate 26. Also, the box 12 could accommodate other electrical power devices instead of a dual power outlet.

Figure 3:
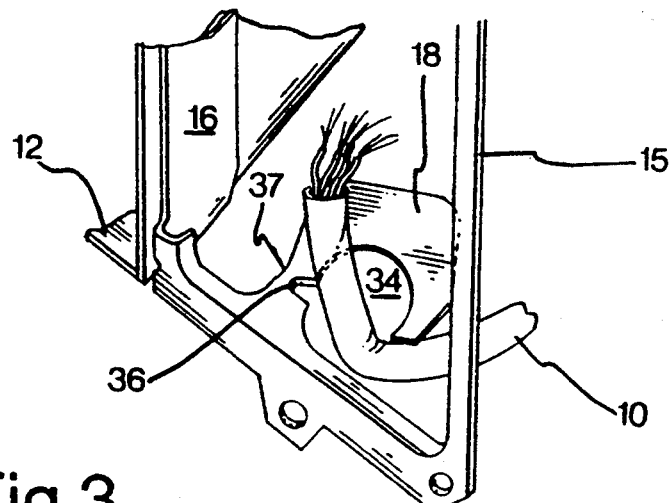
FIGS. 3 and 4 are detail views of a portion of the holding device of FIGS. 1 and 2 illustrating how a tab may be bent to receive, and then hold, a communication cable.
Figure 4:
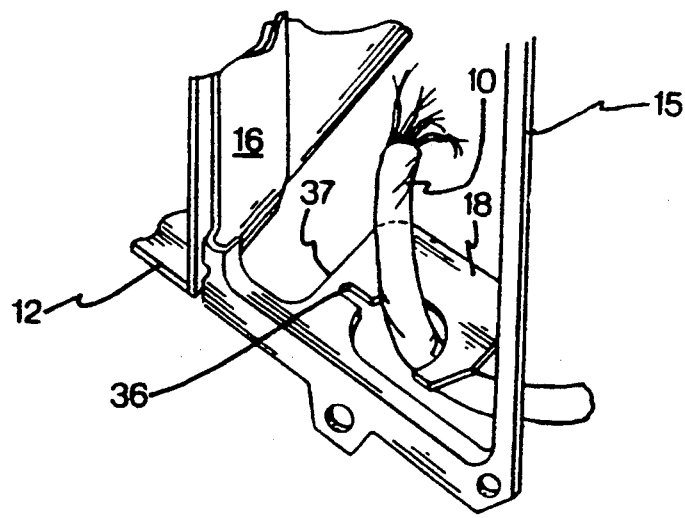

Referring to FIG. 2, each tab 18 comprises a flat piece of material having an outer edge, an opening 34 for receiving the cable 10 (FIGS. 1, 3 and 4), and a first slot 35 extending from the outer edge 33 to the opening 34. The tab 18 is manually bendable whereby the slot 35 may be enlarged, as shown in FIG. 3, to allow passage of cable 10 to the opening 34. Thereafter, the tab may be bent back to at least partially close the slot 35 to retain the cable 10 in the opening 34, this condition being shown in FIG. 4.

The tab 18 may also have a second slot 36 spaced from the first slot 35. As can be seen in FIGS. 2-5 the slot 36 extends from the opening 34 a distance short of the outer edge 33 to form a zone of weakness 37 between the slot 36 and the outer edge 33, whereby the tab 18 is easily manually bendable.

As will be apparent from the drawings, especially FIGS. 2-5, the tabs 18 are integral with the main portion 15 of the frame. The device 14 is preferably made of metal and may be formed from flat metal stock by common metal forming operations such as stamping, bending, etc.

As shown in FIGS. 5 and 6, it is preferred to fold back the material around the opening 34 to provide a smooth surface 40 so as not to damage the cable 10, e.g. if it is pulled by the person installing the cable outlet 23.

FIG. 7 shows a modified cable holding device 14 according to the invention attached to an electrical power outlet box 12. This arrangement is essentially the same as that described above, except that the tabs 18 are longer. The longer tabs 18 provide the advantage of holding the communication cable farther away from the wallboard during its installation. Wallboard installers sometimes use electric routers (power driven rotating bits) to cut openings in the wallboard. The routers are usually longer than the thickness of the wallboard and, should the cable by chance be located close to the wallboard, it could easily be damaged.

Figure 8:
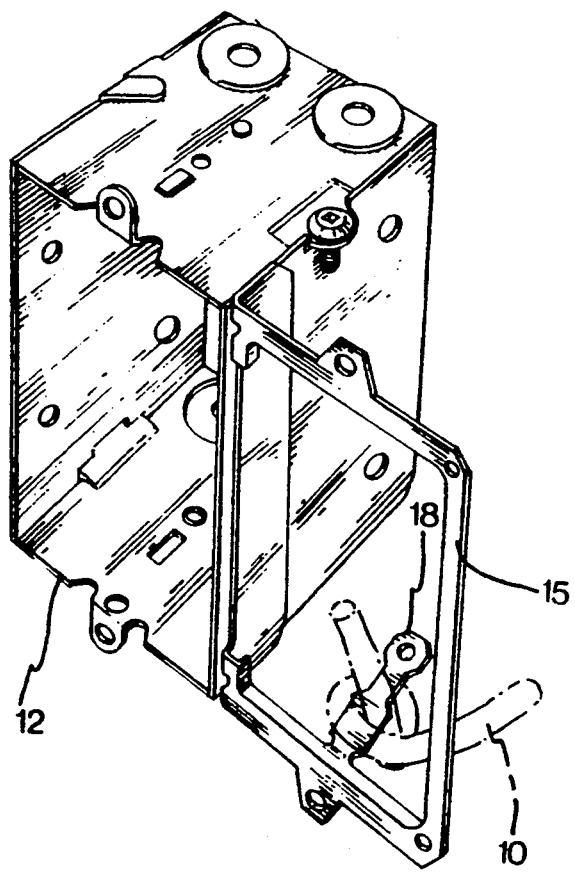
FIGS. 8 and 9 are perspective views of cable holding devices attached to outlet boxes in which the tab is elongated so that a communication cable can be attached to the tab by tying a knot in the cable.
Figure 9:
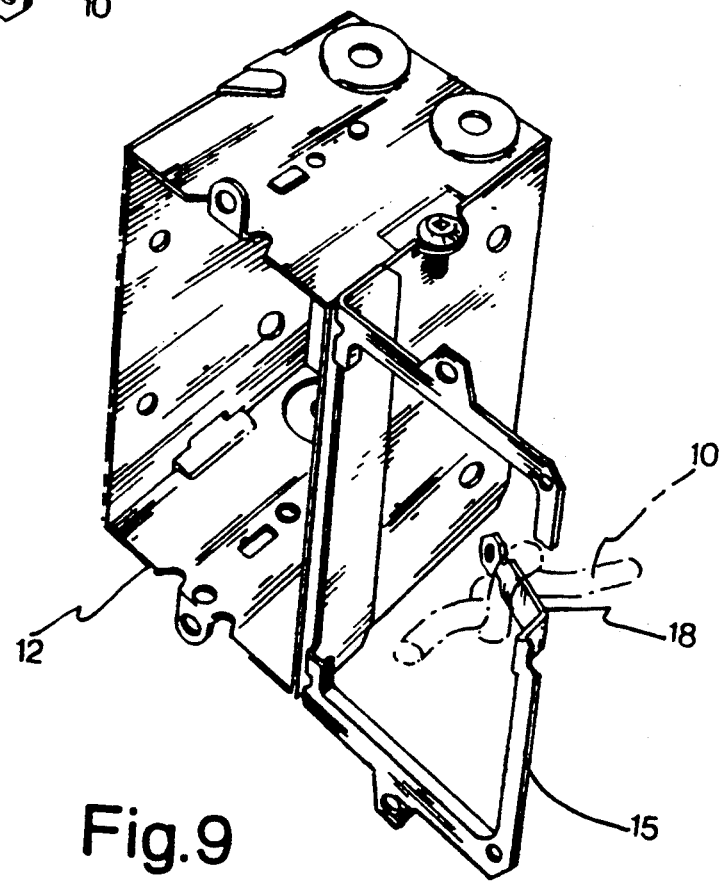

FIGS. 8 and 9 show modified arrangements which differ from that shown in FIGS. 1-6 in that the tab 18 is simply an elongated piece of metal to which the cable 10 can be secured by means of a knot in the cable. In FIG. 8, the tab 18 extends from the bottom of frame portion 15. A second tab, not shown, could be provided at the top of frame portion 15. In FIG. 9, the tab 18 extends rearwardly and inwardly from the outer side of frame portion 15. A part of frame portion 18 has been omitted in FIG. 9 in order to clearly show tab 18.

Figure 10:
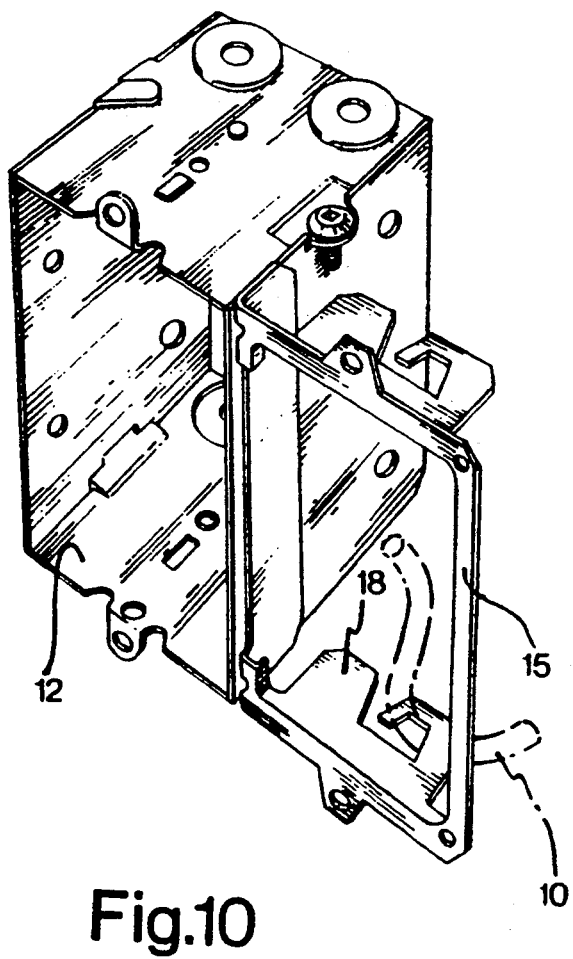
FIGS. 10 and 11 are perspective views, similar to FIG. 2, showing modified forms of tabs.

The arrangement shown in FIG. 10 is essentially the same as that shown in FIGS. 1 to 6, except for the shape of tab 18.

Figure 11:
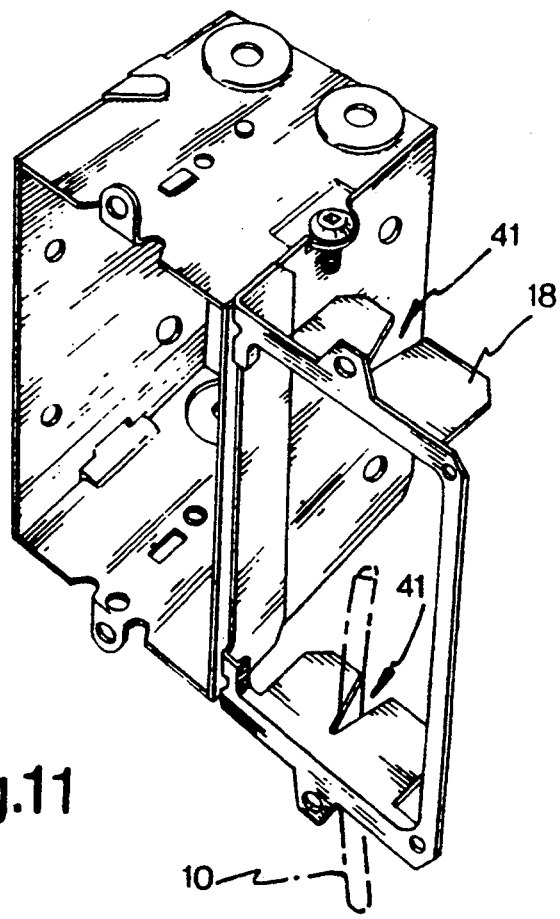

In the arrangement shown in FIG. 11 the tabs 18 have notches 41 for securing the cable 10.

In all embodiments the frame is preferably mounted to the outlet box 12 with the front face of the main portion 15 of the frame substantially coplanar with a front face of the outlet box 12 defined by the front edges of the walls of the outlet box. This is not essential as far as the cable holding function is concerned but does ensure proper mounting of the cable connector 23 and wall plate 26.

The above description of various preferred embodiments of the inventoin should not be interpreted in any limiting manner as variations and refinements of these embodiments are possible without departing from the spirit of the invention. The scope of the invention defined in the annexed claims.

The embodiments of the invention in which an exclusive property or privilege is claimed are defined as follows:

1. A cable holding device for holding a communication cable beside an electrical power outlet box having a rectangular front opening, said device comprising a frame having a main generally rectangular frame portion forming a rectangular frame opening, said rectangular frame being attached directly beside said electrical power outlet box and substantially equal to said rectangular front opening of said electrical power outlet box, and a base portion, said base portion extending at substantially a right angle to said main generally rectangular frame portion for mounting said device to a side of said outlet box, said frame having at least one tab to which said communication cable is secured for access through said rectangular frame opening.

2. The device as claimed in claim 1 wherein said at least one tab comprises a flat piece of material having an outer edge, a cable opening for receiving the cable, and a first slot extending from said outer edge to said cable opening, said tab being manually bendable to enlarge said first slot to allow passage of said cable to said opening, after which said first slot is at least partially closed to retain said cable in said cable opening.

3. The device as claimed in claim 2, wherein said at least one tab comprises a second slot spaced from said first slot, said second slot extending from said cable opening a distance short of said outer edge to form a zone of weakness between said second slot and said outer edge whereby said tab is easily manually bendable.

4. The device as claimed in claim 3 wherein said at least one tab is integral with said frame.

5. The device as claimed in claim 4 wherein said device is made of metal, said metal being folded back around said cable opening to provide a smooth surface so as not to damage said cable.

6. The device as claimed in claim 1 wherein said at least one tab is elongated and has a length sufficient to secure said cable to it by means of a knot in the cable.

7. The device as claimed in claim 1 wherein said at least one tab has a V-shaped notch for receiving and retaining said cable.

8. The device as claimed in claim 1, 2, 3, 4, 6 or 7 wherein said device is made of metal.

9. The device as claimed in claim 1, 2, 3, 4, 5, 6 or 7 adapted for use with a wall plate and wherein said generally rectangular portion has threaded holes located to receive screws for securing said wall plate.

10. A combination comprising an electrical power outlet box and a cable holding device for holding a communication cable beside said outlet box, said outlet box having a top, a bottom, first and second sides and a back and defining a rectangular front opening, said device comprising a frame having a main portion and a base portion, said main portion being attached directly beside said outlet box, said base portion extending at substantially a right angle to said main portion and being secured to one of said sides of said outlet box, said frame having at least one tab to which said communication cable is secured.

11. The combination as claimed in claim 10 wherein said at least one tab comprises a flat piece of material having an outer edge, an opening for receiving the cable, and a first slot extending from said outer edge to said opening, said tab being manually bendable to enlarge said slot to allow passage of said cable to said opening after which said slot is at least partially closed to retain said cable in said opening.

12. The combination as claimed in claim 11 wherein said at least one tab comprises a second slot spaced from said first slot, said second slot extending from said opening a distance short of said outer edge to form a zone of weakness between said second slot and said outer edge whereby said tab is easily manually bendable.

13. The combination as claimed in claim 12 wherein said at least one tab is integral with said frame.

14. The combination as claimed in claim 13 wherein device is made of metal, said metal being folded back around said opening to provide a smooth surface so as not to damage said cable.

15. The combination as claimed in claim 10 wherein said at least one tab is elongated and has a length sufficient to secure said cable to it by means of a knot in the cable.

16. The combination as claimed in claim 10 wherein said at least one tab has a V-shaped notch for receiving and retaining said cable.

17. The combination as claimed in claim 10, 11, 12, 13, 15 or 16 wherein said device is made of metal.

18. The combination as claimed in claim 10, 11, 12, 13, 14, 15 or 16 adapted for use with a wall plate and wherein said frame is substantially rectangular and has threaded holes to receive screws for securing said wall plate.

19. A cable holding device for holding a communication cable beside an electrical power outlet box, said device comprising a metal frame having a main generally rectangular frame portion forming a generally rectangular opening and a base portion, said base portion extending at substantially a right angle to said main generally rectangular frame portion for mounting said device to a side of said outlet box, said frame having at least one integral tab to which said communication cable is secured, said at least one tab comprising a flat piece of metal having an outer edge, a cable opening for receiving the cable, and a first slot extending from said outer edge to said cable opening, said tab being manually bendable to enlarge said first slot and allow passage of said cable to said cable opening after which said first slot is at least partially closed to retain said cable in said cable opening, said at least one tab comprising a second slot spaced from said first slot, said second slot extending from said cable opening a distance short of said outer edge to form a zone of weakness between said second slot and said outer edge whereby said tab is easily manually bendable.

20. The combination comprising an electrical power outlet box and a cable holding device for holding a communication cable beside said outlet box, said outlet box having a top, a bottom, first and second sides and a back and defining a rectangular front opening, said device comprising a metal frame having a main portion and a base portion, said base portion extending at substantially a right angle to said main portion and being secured to one of said sides of said outlet box, said frame having at least one integral tab adapted to secure said communication cable, said at least one tab comprising a flat piece of metal having an outer edge, an opening for receiving the cable, and a first slot extending from said outer edge to said opening, said tab being manually bendable to enlarge said slot to allow passage of said cable to said opening after which said slot is at least partially closed to retain said cable in said opening, said at least one tab comprising a second slot spaced from said first slot, said second slot extending from said opening a distance short of said outer edge to form a zone of weakness between said second slot and said outer edge whereby said tab is easily manually bendable.

21. A cable holding device for holding a communication cable beside an electrical power outlet box having a rectangular front opening, said device comprising a metal frame having a main generally rectangular frame portion forming a rectangular frame opening substantially equal to said rectangular front opening of said electrical power outlet box and a base portion, said main portion being attached directly beside said outlet box, said base portion extending at substantially a right angle to said main portion for mounting said device to a side of said outlet box, said frame having at least one integral tab adapted to secure said communication cable, said at least one tab being elongated and having a length sufficient to secure said cable to it by means of a knot in the cable.

22. A combination comprising an electrical power outlet box and a cable holding device for holding a communication cable beside said outlet box, said outlet box having a top, a bottom, first and second sides and a back and defining a rectangular front opening, said device comprising a metal frame having a main portion and a base portion, said main portion being attached directly beside said outlet box, said base portion extending at substantially a right angle to said main portion and being secured to one of said sides of said outlet box, said frame having at least one integral tab adapted to secure said communication cable, said at least one tab being elongated and having a length sufficient to secure said cable to it by means of a knot in the cable.

23. A cable holding device for holding a communication cable beside an electrical power outlet box having a rectangular front opening, said device comprising a metal frame having a main generally rectangular frame portion forming a rectangular frame opening substantially equal to said rectangular front opening of said electrical power outlet box and a base portion, said main portion being attached directly beside said outlet box, said base portion extending at substantially a right angle to said main portion for mounting said device to a side of said outlet box, said frame having at least one integral tab to which said communication cable is secured, said at least one tab having a V-shaped notch for receiving and retaining said cable.

24. A combination comprising an electrical power outlet box and a cable holding device for holding a communication cable beside said outlet box, said outlet box having a top, a bottom, first and second sides and a back and defining a rectangular front opening, said device comprising a metal frame having a main portion and a base portion, said main portion being attached directly beside said outlet box, said base portion extending at substantially a right angle to said main portion and being secured to one of said sides of said outlet box, said frame having at least one tab to which said communication cable is secured, said at least one tab having a V-shaped notch for receiving and retaining said cable.

* * * * *